United States Patent
Armsden et al.

(10) Patent No.: US 10,317,142 B2
(45) Date of Patent: Jun. 11, 2019

(54) HEAT EXCHANGER HAVING A MECHANICALLY ASSEMBLED HEADER

(71) Applicant: Halla Visteon Climate Control Corp., Daejeon (KR)

(72) Inventors: Richard Armsden, Chelmsford (GB); Greg Whitlow, Van Buren Township, MI (US)

(73) Assignee: HANON SYSTEMS, Daejeon-si (KR)

( * ) Notice: Subject to any disclaimer, the term of this patent is extended or adjusted under 35 U.S.C. 154(b) by 648 days.

(21) Appl. No.: 14/467,863

(22) Filed: Aug. 25, 2014

(65) Prior Publication Data

US 2016/0054069 A1    Feb. 25, 2016

(51) Int. Cl.

| B23P 15/26 | (2006.01) |
|---|---|
| F28D 7/00 | (2006.01) |
| B21D 53/08 | (2006.01) |
| B23K 1/00 | (2006.01) |
| F28F 9/02 | (2006.01) |
| F28F 9/14 | (2006.01) |
| F28F 9/16 | (2006.01) |
| B21D 41/02 | (2006.01) |

(52) U.S. Cl.
CPC ......... *F28D 7/0066* (2013.01); *B21D 53/085* (2013.01); *B23K 1/0012* (2013.01); *F28F 9/0224* (2013.01); *F28F 9/14* (2013.01); *F28F 9/165* (2013.01); *B21D 41/02* (2013.01); *B23P 15/26* (2013.01)

(58) Field of Classification Search
CPC .................. F28F 9/04; F28F 9/16; F28F 9/14
See application file for complete search history.

(56) References Cited

U.S. PATENT DOCUMENTS

| 3,471,178 A | * | 10/1969 | Roe | ......................... F16L 23/02 |
|---|---|---|---|---|
| | | | | 156/289 |
| 4,570,317 A | * | 2/1986 | Veling | .................. B21D 53/085 |
| | | | | 29/522.1 |

(Continued)

FOREIGN PATENT DOCUMENTS

| CN | 1515866 A | 7/2004 |
|---|---|---|
| DE | 3308349 A1 | 9/1984 |

(Continued)

*Primary Examiner* — Keith M Raymond
*Assistant Examiner* — Paul S Schwarzenberg
(74) *Attorney, Agent, or Firm* — Shumaker, Loop & Kendrick, LLP; James D. Miller

(57) ABSTRACT

A heat exchanger and methods of manufacturing and assembling a heat exchanger, and more particularly to an air-flow heat exchanger having a mechanically assembled header for use in a motor vehicle. The heat exchanger comprises an all-metal bonded matrix including a plurality of substantially parallel metallic tubes and a plurality of metallic fins. The tubes have a heat transfer portion that is elongate in cross-sectional shape, and which comprises two opposing, longer sides, and two opposing shorter sides. At least one of the tubes is mechanically joined at a first end portion thereof to a first header of the heat exchanger by at least one compliant member. The compliant member extends around the first end portion of the tube to provide a seal and to permit relative movement between the mechanically joined tube and the first header due to thermal expansion and contraction of the matrix.

19 Claims, 8 Drawing Sheets

(56) References Cited

U.S. PATENT DOCUMENTS

| | | | |
|---|---|---|---|
| 5,004,045 A * | 4/1991 | Le Gauyer | B23K 1/0012 |
| | | | 165/149 |
| 5,123,482 A * | 6/1992 | Abraham | F28D 1/0535 |
| | | | 165/173 |
| 5,190,100 A * | 3/1993 | Hoshino | B21C 37/22 |
| | | | 165/110 |
| 5,219,024 A * | 6/1993 | Potier | F28D 1/05383 |
| | | | 165/151 |
| 5,318,113 A * | 6/1994 | Potier | F28D 1/05366 |
| | | | 165/173 |
| 5,579,832 A * | 12/1996 | Le Gauyer | B21D 41/00 |
| | | | 165/173 |
| 5,901,784 A | 5/1999 | Potier | |
| 6,012,514 A * | 1/2000 | Swain | F28D 7/106 |
| | | | 165/143 |
| 6,719,037 B2 | 4/2004 | Crook | |
| 7,234,511 B1 | 6/2007 | Lesage | |
| 2005/0178525 A1* | 8/2005 | Pierce | F28D 1/05333 |
| | | | 165/79 |
| 2006/0196052 A1* | 9/2006 | Lesage | B21D 53/085 |
| | | | 29/890.043 |
| 2009/0139703 A1* | 6/2009 | Vet | F28F 9/0229 |
| | | | 165/173 |
| 2011/0024037 A1* | 2/2011 | Becnel | B21D 53/02 |
| | | | 156/295 |

FOREIGN PATENT DOCUMENTS

| | | |
|---|---|---|
| FR | 2517572 A1 | 6/1983 |
| JP | 07006753 B | 1/1995 |
| KR | 95-33986 | 12/1995 |

* cited by examiner

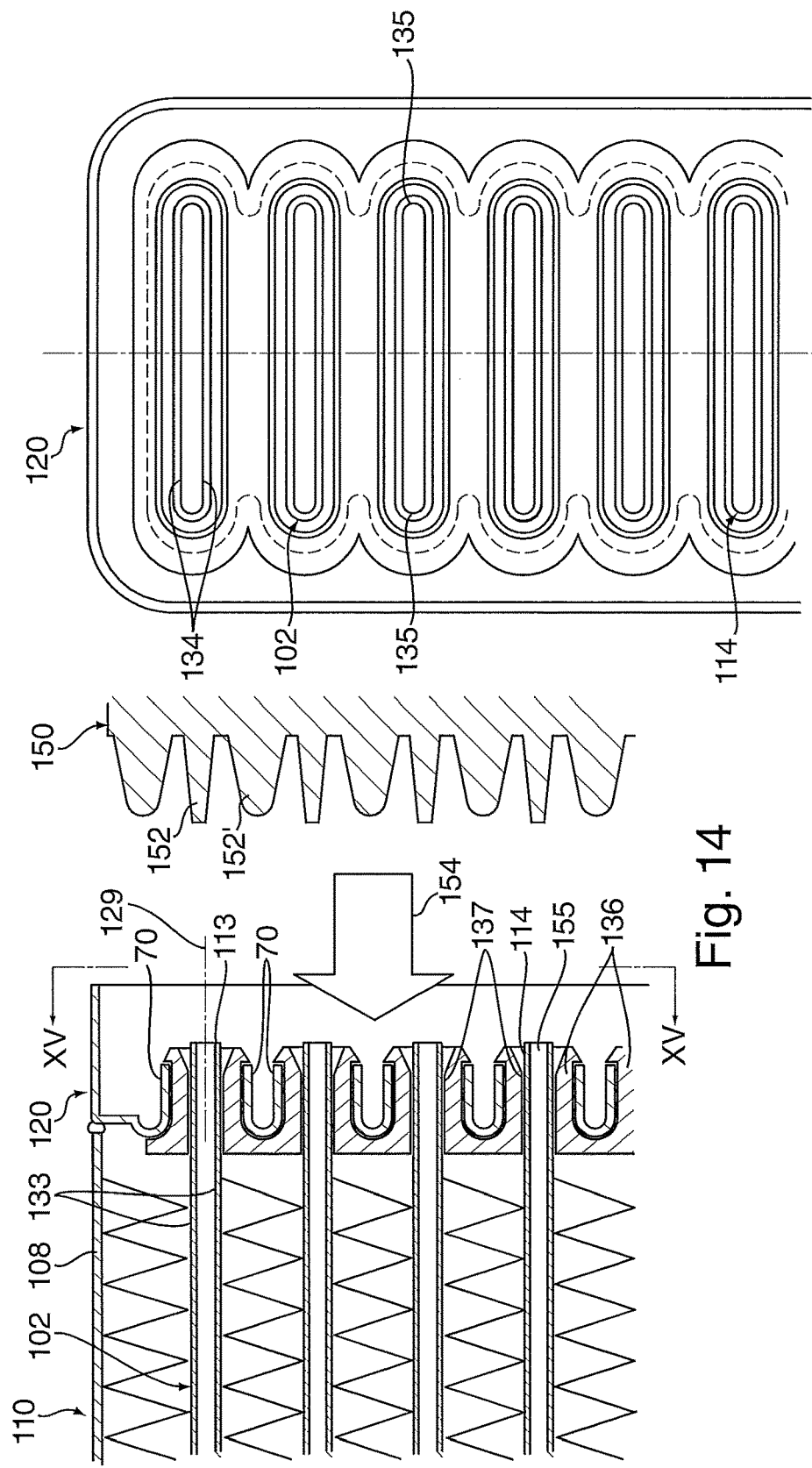

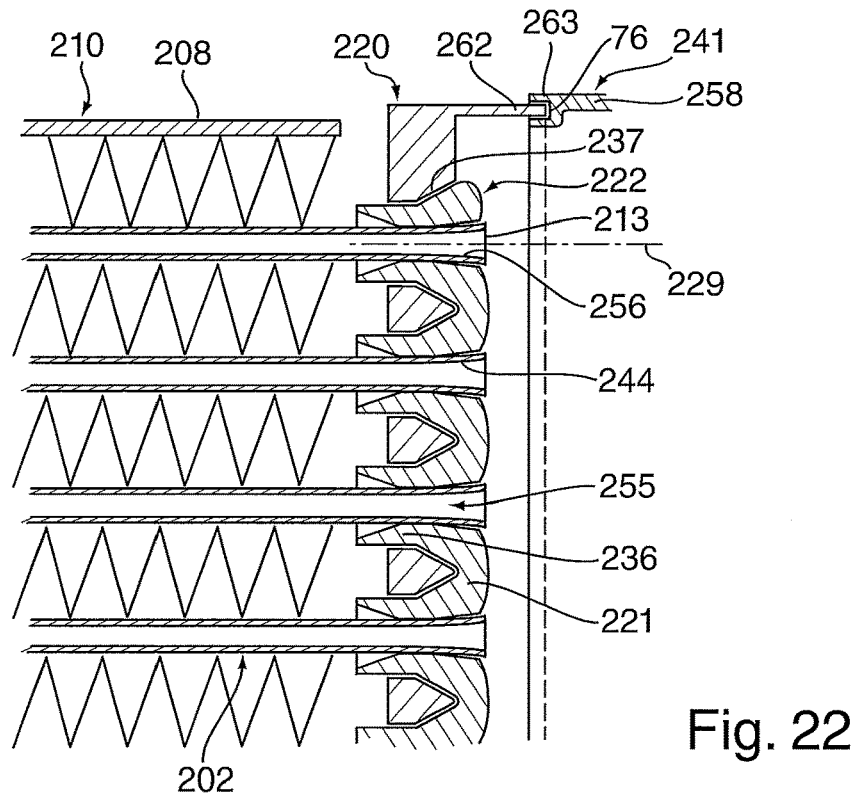

HEAT EXCHANGER HAVING A MECHANICALLY ASSEMBLED HEADER

FIELD OF THE INVENTION

The present invention relates to a heat exchanger and to methods of manufacturing and assembling a heat exchanger, and more particularly to an air-flow heat exchanger having a mechanically assembled header for use in a motor vehicle.

BACKGROUND OF THE INVENTION

Typically, automotive vehicles are provided with an engine cooling system including a heat exchanger, which is usually referred to as a radiator. When the engine is running, heat is transferred from the engine to a coolant that flows through the engine. The coolant then flows from the engine to the heat exchanger through a series of conduits. At the heat exchanger, heat is transferred from the coolant to cooler air that flows over the outside of the heat exchanger. This process repeats itself in a continuous cycle thereby cooling the engine.

Heat exchangers are also used in air conditioning systems for intercoolers in turbochargers and superchargers, and for auxiliary cooling of electronic power supplies in electric vehicles.

A typical heat exchanger includes a series of tubes supported by two chambers, which are usually called headers, positioned at either end of a heat exchanging portion, which is usually called the matrix. The matrix comprises a series of parallel tubes which carry a liquid coolant between the headers, on the way from an input port and an outlet port to the headers. Air flow between the tubes helps to dissipate heat in the cooling medium. To increase the surface area of the matrix and increase the ability of the matrix to dissipate heat, the tubes are usually spanned by a series of fins that extend either in parallel in a direction transverse to the length of the tubes, or in a zigzag orientation between the tubes.

Although the headers may be partly or wholly of a polymer material, the matrix of the heat exchanger is of metal, for example an aluminium alloy. The header has a base plate, also normally of metal, to which the ends of the tubes are connected. Side walls of the headers may be of metal, but for reasons of cost are now often made from a plastic material, which is secured to the metal base plate, for example by crimps in the metal, with a seal between the metal base plate and header side walls being made by a compliant, compressible gasket or o-ring that extends around the periphery of the join between the base plate and side walls.

There are two known ways of fabricating such heat exchangers. One is to use "controlled atmosphere brazing" (CAB) to bond together the matrix and metal part of each header that is joined to the matrix. Any such CAB process or welding process is referred to in this description as a "heating and fusing process".

The other known way of fabricating such heat exchangers is to avoid welding or brazing of adjacent metal components by using "mechanical assembly" (MA) of the matrix and headers. In this description, the terms "mechanical joints" and "mechanically joined" are used to refer to any such non-welded or non-brazed joints in which adjacent components are held together mechanically by separate in-contact components that are not otherwise bonded together.

In the CAB process, flattened metal tubes are interspaced with metal fins that span the gaps between tubes, usually in a zigzag pattern. In many CAB heat exchangers, the tubes each comprise a single enclosed channel or, alternatively, a pair of side-by-side single channels that are separated by a longitudinally extending partition wall to form a double enclosed channel. The tubes have a generally elongate, substantially rectangular cross-sectional shape, and comprise two opposing, longer sides or faces that are substantially flat, and two opposing curved shorter sides, or ends. The fins are then brazed to the long sides and do not extend substantially beyond the bounds of the short sides. The ends of each tube extend inside apertures in metallic header base plates. The gap between adjacent metal components is kept to less than about 0.15 mm so that the gaps are spanned and sealed by solder when the assembly is passed through a braze furnace to form the braze joint between components. The metal components are preferably all of aluminium alloy to provide high thermal conductivity.

In the MA process, the fins, tubes and headers are all held together not by metallic joints but by friction or mechanical coupling. The fins, instead of being folded or corrugated to extend in the same direction as the tubes, extend continuously at right angles to the tubes, and therefore have apertures through which each tube passes. In this arrangement, the fins are closely spaced apart in parallel, and usually extend to the opposite front and rear surfaces of the matrix. The tubes have a circular cross-section and initially have a diameter less than the diameter of the fin apertures through which the tubes are inserted. The metal components are preferably all of aluminium alloy to provide high thermal conductivity. A tool called a "bullet" is pressed down the inside length of each tube. The bullet has a diameter greater than the initial inside diameter of the tubes, so that each tube is expanded to press against the apertures of the fins. This secures the fins to the tubes with a mechanical joint. The base plate of each header has apertures for the ends of the tubes. The apertures have sufficient clearance for plastic or rubber sealing elements interposed between the metal of the tubes and base plates. A number of known ways are known to make the seal tight, for example by using a conical tool pressed into the tube ends to mechanically expand the tube ends and thereby compress the seal.

Each process has certain advantages and disadvantages as compared with the other. Heat exchangers made using the CAB process provide a higher heat exchange capacity for a given size heat exchanger and are in some ways more mechanically robust because the tubes are flattened and extend to the front and rear faces of the heat exchanger, thereby protecting the fins. A notable disadvantage is that the brazing process requires a long passage through an expensive brazing furnace. Furthermore, during operation of an engine and radiator cooling system, the radiator tubes are subject to thermal cycling (rise and fall of the temperature of the heat exchanger components) which leads to stresses as neighbouring tubes may expand to different degrees such that axial loads are imposed on tubes by their neighbours. Therefore, thermal expansion of the heat exchanger during use will not, in general, be even, and cracks can develop in certain parts of the heat exchanger depending on the pattern of the coolant flow, leading to leakage and premature failure of the heat exchanger. In particular, to maximise heat exchange capacity, the tubes are arranged side by side with the faces of neighbouring tubes opposing each other and defining a space or passage between the tubes for the fins and through which a cooling medium such as air can flow. This geometry of the tubes is, therefore, favourable as it creates a relatively large surface area over which the cooling medium can pass whilst minimising the disruption to the air flow through the heat exchanger. However, these types of header/tube combinations are prone to failure because of the stress concentrations that occur along the header/tube joint, in particular around the nose of the tubes and where the tube walls are tightly curved.

The MA process avoids the need for a costly brazing furnace, and can therefore be used to produce less expensive heat exchangers. Because the joints between the tube ends and headers are mechanical, the compression joints can be designed to allow for some longitudinal movement between the tubes and headers due to differing thermal expansion when the heat exchanger is heating up or cooling down. An all-mechanical heat exchanger therefore reduces or substantially eliminates thermal stresses between the heat exchanger components, thereby increasing heat exchanger reliability and lifetime. Such heat exchangers are, however, less efficient at transferring heat for a given size, and therefore mechanically jointed heat exchangers have to be larger to provide the same capacity. More space must therefore be provided for a larger heat exchanger in any given application. The fins, being parallel and extending to the front and back of the circular cooling fins, are also much less robust than the zigzag fins nested between flattened tubes of a heat exchanger formed using the CAB process. To maximise the heat transfer capacity, the fins are necessarily thin, about 0.1 mm in thickness, and such fins are easily deformed even by finger pressure. Any such damage will decrease flow of a cooling medium such as air through the heat exchanger. In a motor vehicle radiator, stones or grit can sometimes hit the radiator, causing cumulative damage to the cooling permeability of the matrix.

It is an object of the present invention to provide a heat exchanger and methods of manufacturing and assembling a heat exchanger which addresses at least some of these issues.

SUMMARY OF THE INVENTION

According to a first aspect of the invention, there is provided a heat exchanger comprising: an all-metal bonded matrix including a plurality of substantially parallel metallic tubes and a plurality of metallic fins, said tubes having a heat transfer portion, said heat transfer portion being elongate in cross-sectional shape, and comprising two opposing, longer sides, and two opposing shorter sides, and said fins being in between said opposing, longer sides of the heat transfer portion of adjacent tubes; and a first header and a second header, each of said tubes having at opposite ends of said tubes a first end portion and a second end portion, said first and second end portions being joined respectively to the first and second headers, the matrix thereby being configured to transfer heat between an external medium and a coolant conveyed between said headers by said tubes; wherein at least one of said tubes is mechanically joined at said first end portion to the first header by at least one compliant member, said compliant member extending around said first end portion to provide a seal with said first end portion for coolant held within the heat exchanger and permitting relative movement between said mechanically joined tube and the first header owing to thermal expansion and contraction of said matrix.

The compliant member may be of a plastic or rubber material and is preferably elastic such that is it resiliently deformable and therefore capable of expanding and contracting according to an applied external force.

It should be noted that although this general description relates specifically to the first header and the first end portion of the tubes as having the mechanical joint, the second header and second end portion of the tubes may optionally have the same features of the first header and first end portion of the tubes.

Alternatively, since the relative movement of the mechanically joined first end portion of the tube and first header is accommodated for by the compliant member between the first end portion of the tube and the first header, all of the tube second end portions may be joined to the second header by means of a bond between the metallic materials of the tube and the second header, made in a heating and fusing process.

Generally, the compliant member will be in direct contact with the tube to provide a seal with the tube for coolant held within the heat exchanger and permitting relative movement along the length of the tube of the mechanically joined first end portion of the tube relative to the first header owing to thermal expansion and contraction of the matrix.

The fins will, in general, extend between opposed longer sides of adjacent tubes, the orientation of the tubes and fins being fixed in a heating and fusing process to form an all-metal bonded matrix. The matrix will have opposite first and second faces, the longer sides of the tubes extending between the first face and the second face such that, in use, an external medium such as air flows through the matrix from the first matrix face to the second matrix face to effect the transfer of heat. The heat transfer portion may therefore be substantially rectangular in a cross-section extending between the opposite first and second faces of the matrix.

The relative movement permitted where there is a mechanical joint between the header and tubes prevents stress from building up owing to uneven thermal expansion of the matrix and/or headers. The mechanical joint also permits a wide range of potential ways of joining the tubes to the headers, whilst still maintaining the benefits of an all-metal bonded matrix, in particular relatively high thermal heat transfer efficiency within a compact form, and the potential for a robust design where fins are partially protected from physical damage between the adjacent elongate tubes.

The fins are metallically bonded or fused to the tubes, for example by the application of heat in an oven in a CAB process, a soldering process, a brazing process or a calcination process. For convenience, all such heating processes in which a metal-to-metal bond is formed will be referred to hereinafter as a "heating and fusing process".

In a preferred embodiment of the invention, the longer sides of adjacent tubes are spaced substantially parallel with respect to each other and spaced apart in opposition to one another.

The connection of the tubes may be made to a part of the header nearest the matrix. This part of the header may be a plate-like member, referred to herein as a base plate. To complete the header, this base plate may be covered over with a cover that may be either permanently or removably affixed to the base plate, for example at a rim or lip that extends away from a generally planar portion of the base plate. In a preferred embodiment of the invention, the first header has a first base plate and the second header preferably has a second base plate. The, or each, base plate then may have a plurality of apertures, each for making a flow connection with a corresponding tube, which will have at least one opening at both the first and second end portions.

When the end portions are received in the respective apertures, a sealing portion of the compliant member is interposed between the first base plate and the mechanically joined first end portion around the aperture in order to mechanically join together the first end portion and the first header.

The compliant member then extends around the aperture to provide a seal with the first base plate for coolant held within the heat exchanger. Generally, the compliant member will be in direct contact with the first base plate around the aperture to provide a seal around the aperture for coolant held by the first header.

Each of the first end portions may be received within a corresponding one of the apertures of the first base plate The apertures may each have an elongate shape matching an elongate cross section of the tube, with clearance for receiving the tube and a sealing portion of the compliant member In a preferred embodiment of the invention, each of the second tube end portions is also mechanically joined to the second header by the second base plate at a corresponding aperture. Alternatively, any number of the second tube end portions may be joined to the second header with a metal-to-metal bond, in which case this is preferably formed in the same heating and fusing process used to fuse the components of the matrix together. When there is a plurality of such tubes having all-metal bonds at both end portions, there may be at least one of the mechanically joined tubes in between the all-metal bonded tubes.

Once joined the tubes may, in use, convey the coolant, which may, for example, be a mixture of ethylene glycol and water, through the tube end openings from one header to the other header, each tube having between the tube end portions the heat transfer portion.

The fins preferably extend between opposed longer sides of adjacent pairs of tubes, the tubes and fins together forming the all-metal bonded matrix. The matrix will, in general, have a first face and a second face. It is a particular advantage of the invention if the longer sides of each tube extend between the first and second faces of the matrix. This helps to provide mechanical rigidity to these opposite sides of the matrix. The longer sides of each tube are therefore preferably substantially flush with portions of the fins exposed at the opposite faces of the matrix. Any contact with one of the faces can therefore be substantially deflected or shielded by the sorter sides of each tube, which will, in general, be much more robust than fins, which are typically relatively thin in comparison.

The arrangement of the matrix components is such that, in use, an external medium, for example air, flows through the matrix from the first face to the second face to effect the transfer of heat.

In preferred embodiments of the invention, the first end portion of the mechanically joined tube has an expanded portion, the sealing portion of the compliant member being compressed around the aperture by the expanded portion of the tube.

The compliant member is therefore compressed between opposing surfaces of each expanded first end portion and the corresponding aperture in the first base plate. The compressed compliant member therefore provides a seal between the, or each, mechanically joined first end portion and the corresponding aperture in the first base plate in which the first end portions are received.

The opening of the first end portion therefore has internal dimensions that are outwardly expanded around the periphery of the opening.

The expanded end portion may be elongate in cross-sectional shape, and may therefore comprise two opposing, longer sides, and two opposing shorter sides.

Each of the first tube end portions may have an expanded cross-sectional shape relative to that of the heat transfer portion. This expansion reduces coolant flow resistance at the opening to each tube, while at the same time acting to compress the sealing portion of the compliant member between the first end portion and the base plate aperture. This facilitates the formation of a good seal, particularly around corners or along shorter edges of the tube end portion and compliant member.

There may be a tapering section of the tube that extends from the heat transfer portion and towards the expanded end portion, with an outwardly tapered shape, in which the distance between the two opposing, longer sides of the tube is increased and the distance between the two opposing shorter sides is also increased. The compliant member is thereby compressed around the full extent of the aperture by the expanded portion of the tube.

The mechanically joined first end portion will, in general, have an opening for conveying the coolant. The two opposing, longer sides of the expanded end portion may be splayed outwards proximate the opening and the two opposing shorter sides of the expanded end portion may be splayed outwards proximate the opening. In this way, the first end portion is provided with the expanded end portion.

The expanded end portion may have a section with a substantially constant cross-sectional shape in contact with the sealing portion of the compliant member. The benefit of having this constant shape over the expected extent of longitudinal movement of the tube, is that the sealing portion is neither compressed nor expanded owing to the relative movement of the mechanically joined first end portion and the first header owing to thermal expansion and contraction of the matrix. This helps to ensure a reliable contact, even when the tube moves in a longitudinal direction owing to thermal expansion or contraction.

Preferably, the degree of expansion and contraction in the, or each, mechanical joint accommodated for in the design of the heat exchanger, when used in an automotive environment, equates to a temperature range of −40° C. to 120° C.

The compliant member may have a base portion and at least one projecting portion. In preferred embodiments of the invention, the base portion is seated on a surface of the first base plate and the, or each, projecting portion extends through a corresponding one of the apertures in the first base plate. In this way, the sealing portion of the compliant member is interposed between the first base plate and the mechanically joined first end portion.

There may be a separate one of the compliant members for each of the expanded tube end portions. In this case, each of the compliant members may extend through a corresponding aperture in the header or base plate, whereby each of the compliant members is interposed between a corresponding expanded tube end portion and the aperture.

Alternatively, the base portion of the compliant member may be a unitary component, for example, a sheet with a plurality of apertures therein, each of the apertures in the sheet having a raised rim that provides the projecting portion, and each of these rims extending through a corresponding aperture in the first base plate. In this way, each of the rims is interposed between the first base plate and the mechanically joined first end portion to provide the sealing portion.

The base portion of the compliant member is seated on an external surface of the first base plate facing substantially towards the matrix. Alternatively, the base portion of the compliant member may be seated on an internal surface of the first base plate facing substantially away from the matrix.

When one or both of the headers has a base plate, this may have a periphery and a cover which is joined to this periphery. The first header cover and the sheet may then extend to the periphery to provide a seal around the periphery between the base plate and cover.

The header and/or base plate need not be made from metal. The header and/or base plate may be of polymer material. A polymer material header cover may be sealed to the corresponding polymer material base plate by a bonded seam, for example, glued or vibration-welded, to form a polymer bond.

Alternatively, the polymer cover of the header and the polymer material of the first base plate may have between these components at least one clip retaining feature by which the cover of the first header is secured to the first base plate.

The heat transfer portion may be substantially rectangular in cross-section in a plane extending transversely to the length of the tubes.

Adjacent first end portions may have separate compliant members, however in preferred embodiments, adjacent tube ends have compliant members that are provided by a unitary component.

There are two ways in which relative movement can be accommodated by the compliant member. The compliant member may be capable of flexing in order to permit the relative movement of the tube end portion. Alternatively, or additionally, the compliant member may be capable of sliding in contact with the expanded tube end portion in order to permit the relative movement of the tube end portion.

As long as one side of the matrix is mechanically joined to the corresponding header, the other side of the tubes may still be fused to a metal header, as the relative movement of the compliant side will prevent stress build up at the fused side. Therefore, at least one of the tubes may have one end portion that is joined by means of an all-metal bond to the corresponding metallic header or metallic base plate.

According to a second aspect of the invention, there is provided a method of assembling a heat exchanger from a matrix, a first header and a second header, the matrix including a plurality of elongate and substantially parallel metallic tubes and a plurality of metallic fins, said tubes having a heat transfer portion, said heat transfer portion being elongate in cross-sectional shape, and comprising two opposing, longer sides, and two opposing shorter sides, and said fins being in between said opposing, longer sides of the heat transfer portion of adjacent tubes and being joined by all-metal bonds to said adjacent tubes, each of said tubes having at opposite ends of said tubes a first end portion and a second end portion, the method comprising the steps of: joining said first and second end portions respectively to the first and second headers such that the matrix is configured to transfer heat between an external medium and a coolant conveyed between said headers by said tubes, at least one of said tubes being mechanically joined at said first end portion to the first header by at least one compliant member, said compliant member extending around said first end portion to provide a seal with said first end portion for coolant held within the heat exchanger and permitting relative movement along the length of said mechanically joined tube between said joined first end portion and the first header owing to thermal expansion and contraction of said matrix.

Also according to a third aspect of the invention, there is provided a method of manufacturing a heat exchanger, the heat exchanger comprising an all-metal bonded matrix, the method comprising the steps of: forming a first header, said first header having a first set of apertures; forming a second header, said second header having a second set of apertures; forming a plurality of elongate metallic tubes, each of said tubes having a first end portion and a second end portion and an opening at both of said end portions for conveying a coolant through the tubes from one header to the other header, and each tube having between said end portions a heat transfer portion for transferring heat with an external medium, said heat transfer portion being elongate in cross-sectional shape, and comprising two opposing, longer sides, and two opposing shorter sides; forming a plurality of metallic fins; orienting the tubes and fins such that the tubes are substantially parallel with one another and with fins extending between said opposed longer sides of adjacent pairs of tubes; using a heating and fusing process to join together said oriented tubes and fins to form an all-metal bonded matrix, said matrix having a first face and a second face such that, in use, an external medium may flow through said matrix from said first face to said second face to effect said transfer of heat between the coolant conveyed by the tubes and the external medium; aligning said first tube end portions with the first set of apertures and aligning said second end portions with the second set of apertures and joining each of said end portions to the corresponding aligned set of apertures; and with at least one of said tubes, receiving said first end portion within a corresponding aperture of said first set of apertures and using a compliant member to join said tube to the first header in a mechanical joint between said first end portion of said first header and the corresponding aperture within which said first end portion is received, the compliant member providing a seal around said first end portion for said coolant and permitting relative movement along the length of said mechanically joined tube between said joined first end portion and the first header owing to thermal expansion and contraction of said matrix.

The longer sides of the tubes preferably extend between the first face and the second face of the matrix.

Optionally, at least one of the tubes may be joined at both end portions to the corresponding headers by means of an all-metal bond in a heating and fusing process between the end portions and the headers. There may be a plurality of such tubes joined at both end portions to the corresponding headers by means of an all-metal bond in a heating and fusing process, in which case it is preferred if there is at least one of the mechanically joined tubes in between the all-metal bonded tubes.

Alternatively or additionally, the matrix may comprise at least one strip that is substantially parallel with the tubes, the strip being joined to both headers by means of an all-metal bond between the strip and the headers. In preferred embodiments of the invention, the strip is a protective strip between which the tubes are sandwiched.

The method may comprise the steps of: forming a first base plate, the first set of apertures being provided in the first base plate; forming a second base plate, the second set of apertures being provided in the second base plate; forming a first header cover and assembling the first header cover to the first base plate to form the first header; and forming a second header cover and assembling the second header cover to the second base plate to form the second header.

When the second base plate is metallic, the method may comprise the step of joining each of the tubes at the second end portions to the second header by means of an all-metal bond in a heating and fusing process between the second end portions and the second header.

The mechanically joined tube will, in general, have an outer wall. The method may therefore comprise the steps of outwardly expanding the wall in the first end portion relative to the wall in the heat transfer portion. In this way, the sealing portion of the compliant member is compressed in contact with the expanded wall in the end portion to provide the seal and permit the relative movement of the tube end portion relative to the joined base plate owing to thermal expansion and contraction of the matrix.

Prior to the expansion of the wall of the end portion, the method may comprise the steps of inserting the first end portion into a corresponding one of the apertures with which the first end portion is aligned, and interposing the compliant member between this inserted end portion and the first header, and then expanding the corresponding end portion such that the first end portion compresses the compliant member in order to form the seal around the expanded first end portion.

In a preferred embodiment of the invention, the first header has a wall that extends around each of the apertures within which the first end portion is received, and the method comprises the step of expanding this wall of the header inwards towards the received first end portion whereby the sealing portion of the compliant member is compressed in contact with this expanded wall of the first header around the aperture.

BRIEF DESCRIPTION OF THE DRAWINGS

The invention will now be further described, by way of example only, and with reference to the accompanying drawings, in which:

FIG. 14 shows how, after tube end portions of the brazed matrix have been inserted through apertures in the compliant member, an expansion tool with a number of bullet nosed projections is pressed into the openings of each of the tube end portions and also into cup-shaped portions of the metallic header base plate either side of each tube end;

FIG. 15 is a plan view of the inside of the header base plate showing internal parts of the compliant member fitted to the header base plate, taken along line XV-XV of FIG. 14;

FIG. 22 is a is a cross-sectional view of a part of the joined matrix, plastic material header base plate and compliant member of FIG. 20, showing how a plastic material header cover is bonded to the header base plate to complete the assembly of the heat exchanger in the third preferred embodiment of the invention; and FIG. 23 is a cross-sectional view of a part of a heat exchanger having a variant of the header of FIG. 22, in which the plastic material header cover is clipped to the header base plate to complete the assembly of the heat exchanger.

DETAILED DESCRIPTION

Figure 1:
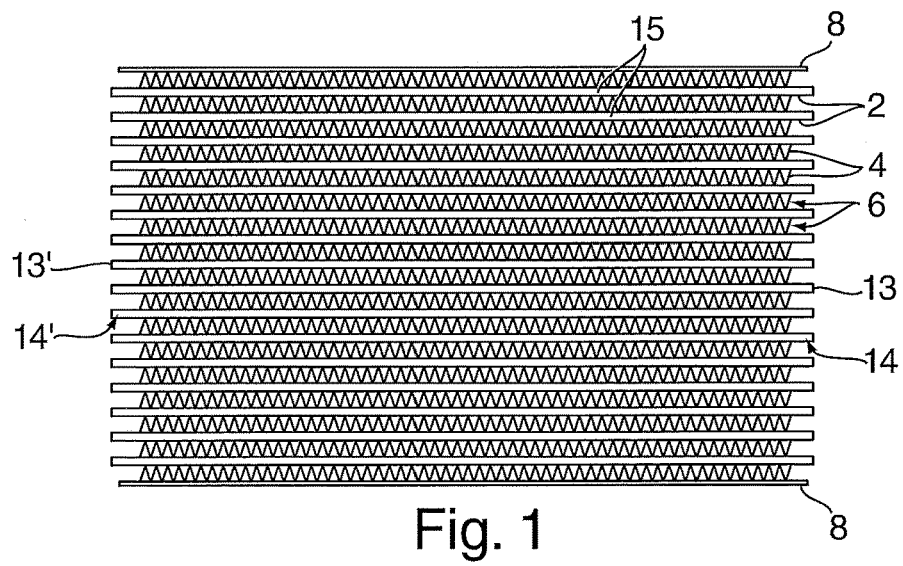
FIG. 1 is a schematic plan view of an assembled array of metallic tubes and metallic fins for a matrix for use in a heat exchanger according to preferred embodiments of the invention, prior to brazing of the components.
Figure 2:
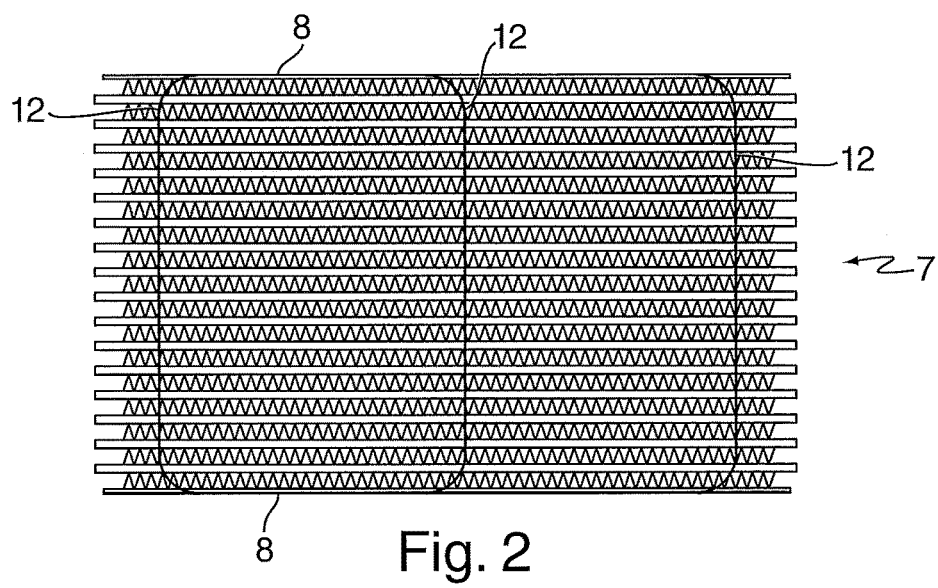
FIG. 2 is a schematic view of the components of FIG. 1 when held together by a temporary frame.
Figure 3:
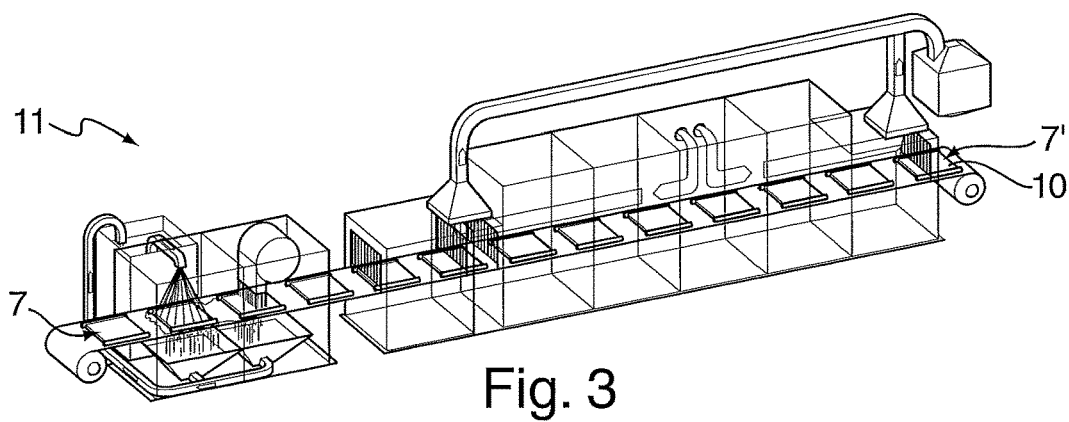
FIG. 3 is a perspective schematic view of a controlled atmosphere brazing (CAB) process used to braze together the components of the matrix of FIG. 1.
Figure 10:
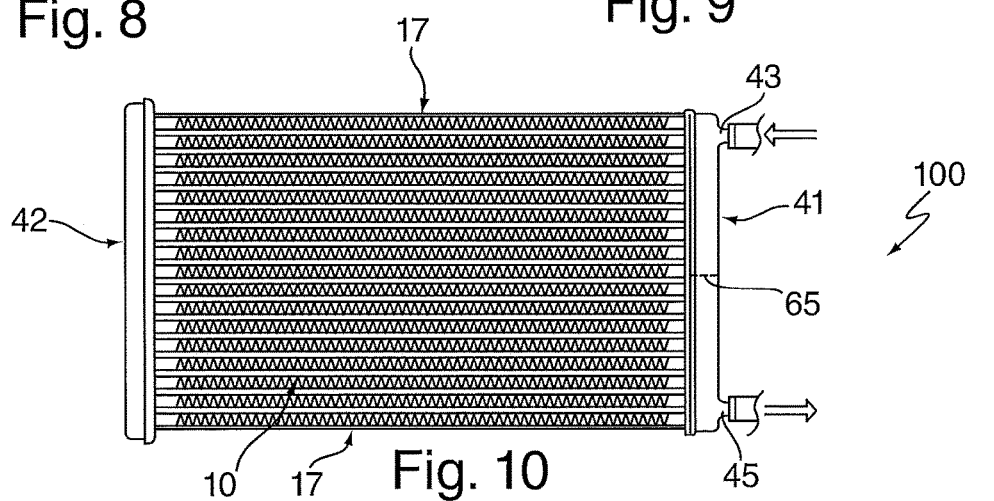
Figure 13:
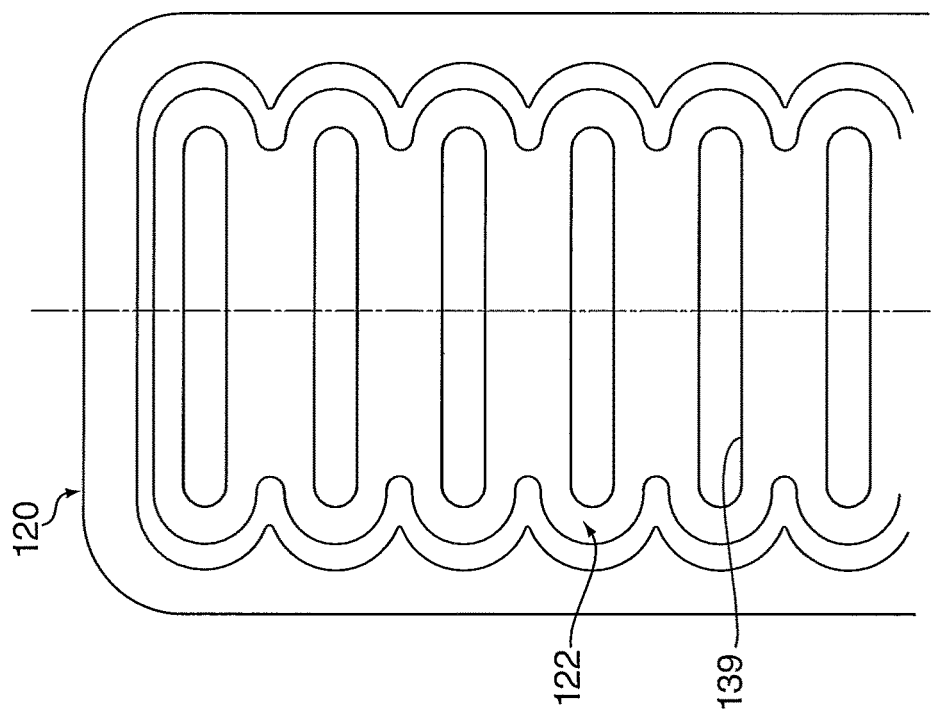
FIG. 13 is a plan view of the external surface of the header base plate, taken along line XIII-XIII of FIG. 12.
Figure 12:
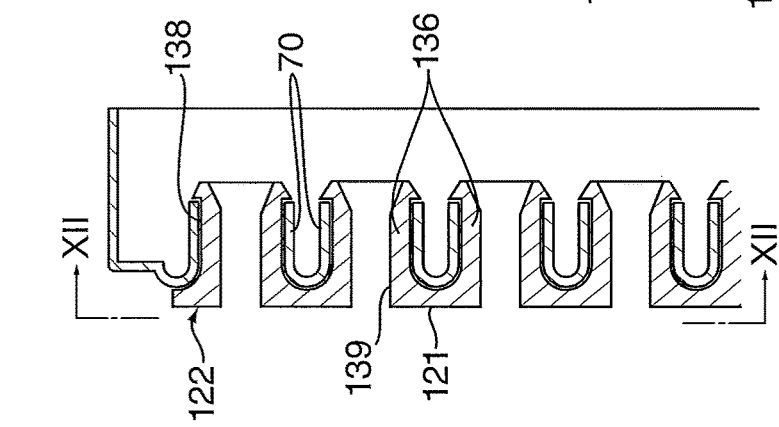
FIG. 12 shows the header base plate and a compliant member of FIG. 11 when fitted together.
Figure 11:
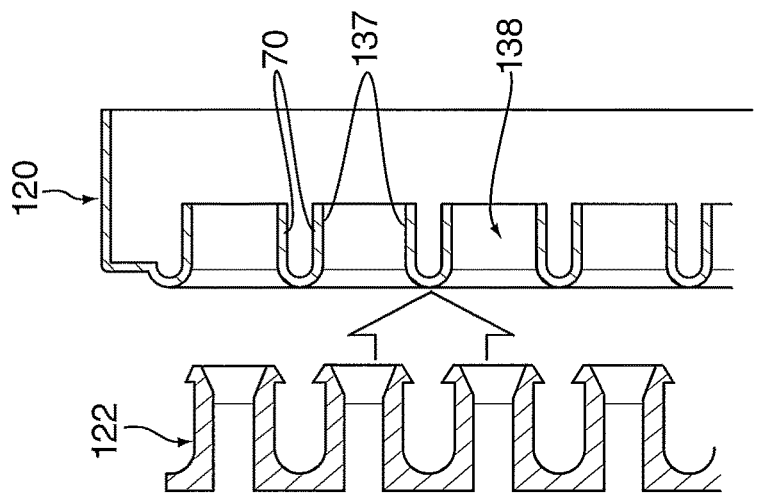
FIG. 11 is a cross-sectional view of a part of a metallic header base plate and a compliant member which is to be fitted to an external surface of the header plate, for use in a heat exchanger according to a second preferred embodiment of the invention.

FIGS. 1 to 3 show the initial stages in the manufacture of a fused assembly 7' including a matrix 10 for a heat exchanger 100 such as that as shown in FIG. 10 and in further embodiments of the invention, which will be described in more detail below. The embodiments all relate to a motor vehicle heat exchanger, although the principles of the invention are applicable to other types of heat exchangers, both for cooling and heating purposes.

A plurality of elongate, longitudinally extending metallic tubes 2, which in this example are formed in aluminium, are first assembled spaced apart in a parallel orientation with metallic fins 4, also of aluminium, in the spaces 6 between adjacent pairs of tubes. The tubes 2 therefore bracket opposite top and bottom sides of each fin 4, except, optionally, for the end-most top and bottom fins which may be bonded on one side by a protective elongate, longitudinally extending component, which in this example is a solid metal strip 8, if it is desired to provide greater mechanical protection at these locations. Although the drawings show end strips 8 in the form of solid metallic bars, an alternative is to omit these bars and the adjacent fins, in which case the tubes 2 are not bracketed by any other component at the top and bottom locations.

FIG. 1 shows the tubes 2, fins 4 and protective end strips 8 prior to brazing of the components. The components are therefore initially loose and not connected. To hold the components together during subsequent processing, a frame or one or more straps are temporarily placed around the components to form a held assembly 7. This is shown, in a schematic form only, by the bracket-shaped lines 12 in FIG. 2.

With the components 2, 4, 8 thus held together, these are subjected to a heating and fusing process, which in this example is a controlled atmosphere brazing (CAB) process 11, as shown in FIG. 3. This process is a conventional process, known to those skilled in the art, for example used to manufacture all-metal heat exchangers including headers or header base plates connected at the ends of the tubes, and will therefore not be described in detail.

It should be noted that, optionally, in some embodiments of the invention, one end of the tubes 2 could be attached in a heating and fusing process to a metallic header, or one or both ends of the tubes could be attached in a heating and fusing process to a corresponding metallic header base plate. These end components could be attached to one or both sides of the assembly 7 prior to the heating and fusing process, and then fused together with the matrix in the same process, or these end components could be fused to a header or header base plate in a separate, later process. In each case, however, at least one tube end on at least one side will not be so joined and will remain separate and then joined with a compliant mechanical joint, as will be described in more detail below.

FIG. 3 therefore shows in outline both such headers or header base plates in place on a moving conveyor belt, however, it is to be appreciated that FIG. 3 is schematic only and that the heating and fusing process is the same when there is just one or no header or header base plate present.

In the case where at least one header or header base plate is included in the heating and fusing process, at least one of the elongate, longitudinally extending components, either the protective strips 8 or tube end portions 14, 14' at the, or each tube end 13, 13', will be fused to the header to make a metal-to-metal joint. However, at least one of the remaining tube ends at one or both headers will then not be so joined during the heating and fusing process, and these free tube ends will then in a subsequent stage of processing be connected mechanically to the corresponding header in one of the ways to be described in more detail below.

At the end of the CAB process 11, the tubes 2, fins 4 and optionally the protective metal strips 8 are fused together with the metal of each component extending seamlessly to the metal of adjacent, touching components. Similarly, if one or both of the headers is included, then at least some of the tube ends will be fused to corresponding apertures in each header or header base plate, but at least one of the tube ends will remain free from a corresponding aperture. In the heating and fusing process, a metal-to-metal joint at a tube end can be prevented from forming by providing a sufficiently wide gap, for example a gap of at least 1 mm with any adjacent surfaces of the header.

FIGS. 4 to 22 relate specifically to the case where there is no header or base plate fused at any tube ends in the same process used to fuse together the matrix 10, so that all the connections to tubes are to be made mechanically. The metal strips 8 are, however, joined in a later heating and fusing process to an external surface of a header base plate 20 to provide mechanical rigidity at opposite top and bottom ends 17, 17' of the heat exchanger 100.

Figure 4:
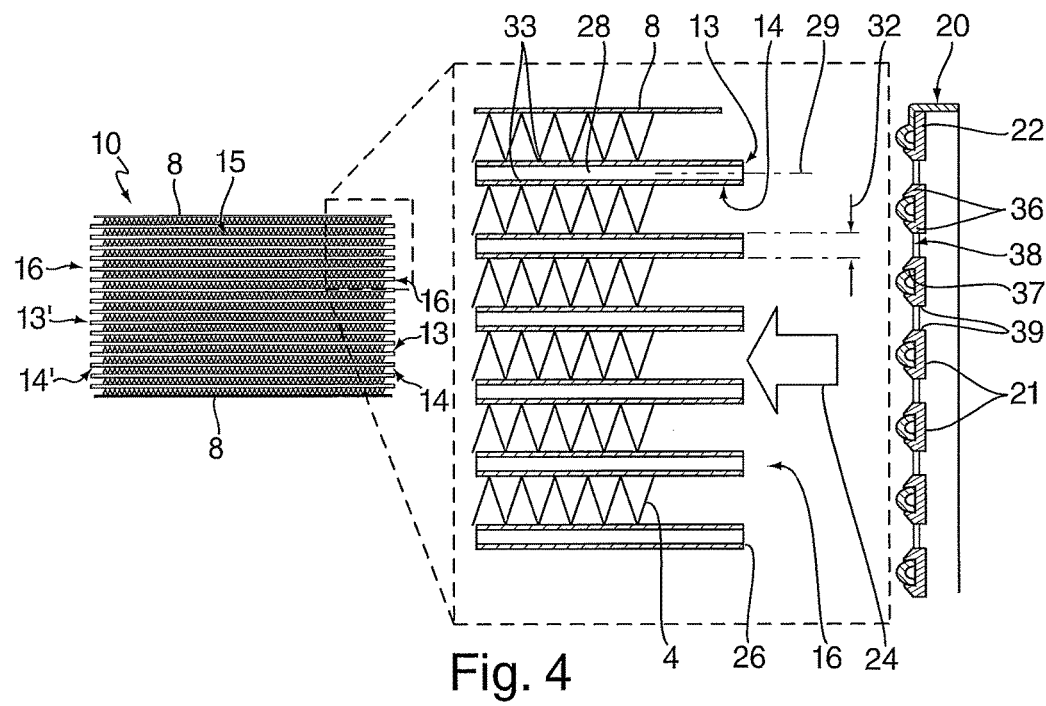
FIG. 4 is a cross-section view of the brazed matrix with an enlarged partial view indicating how a metallic header base plate with internally fitted compliant member is mechanically connected to end portions of the matrix tubes in a first preferred embodiment of the invention.

FIG. 4 therefore shows the fused assembly 7' of FIG. 3 as comprising just the matrix 10. In this example, each tube 2 initially has freely extending opposite longitudinal ends 13, 13'. Each of the tube end portions 14, 14' is aligned in parallel with all the other tube end portions on each of the opposite left and right sides 16, 16' of the matrix 10. The fins 4 extend across a central heat transfer portion 15 of the tubes, which stops short of the tube end portions 14, 14' so that the tube end portions extend freely to the sides of the heat transfer portion and fins.

A header or header base plate is then mechanically coupled to the tube end portions 14, 14' on both sides 16, 16' of the matrix 10. If just one header or header base plate is fully fused with the matrix in the CAB process, then the process will involve mechanically joining one or more of the tubes to the other header or header base plate on the other side of the matrix.

Figures 5, 6:
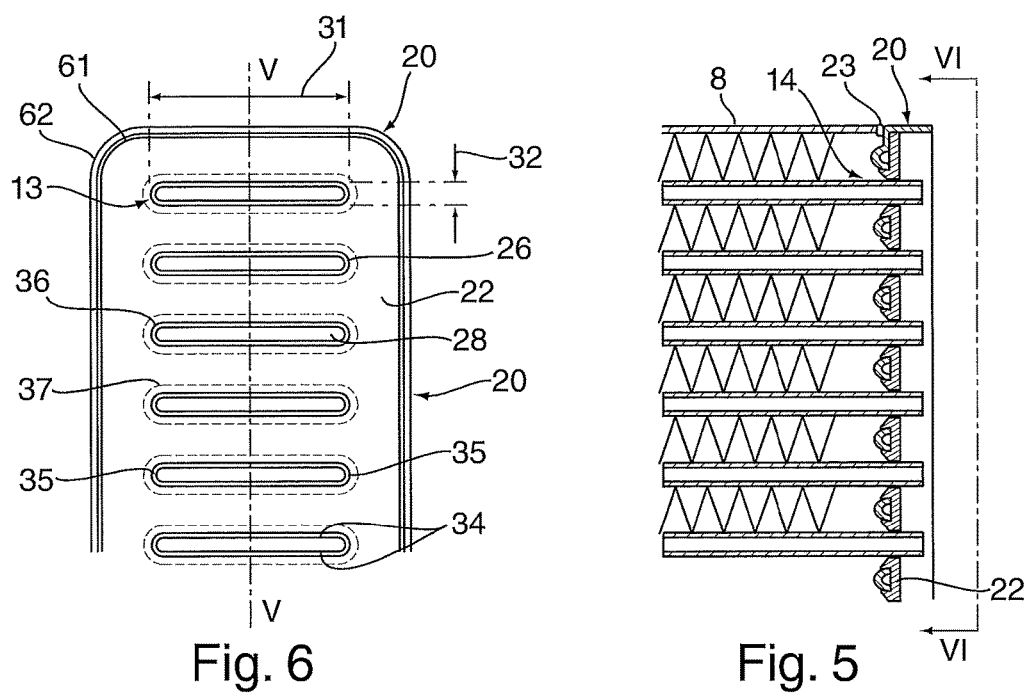
FIG. 5 is a cross-sectional view of a part of the matrix and header base plate after connection to the ends of the matrix tubes, showing how the compliant member has apertures that receive tube end portions so that the compliant member is interposed between the header base plate and end portions of the tubes.
FIG. 6 is a plan view along the direction VI-VI of FIG. 5, showing the inside of the header base plate, the compliant member and the tube ends.

In this example, two header base plates, one of which 20 is shown, are assembled together with a sheet-like compliant member 22 and moved in a longitudinal direction 24 towards the corresponding tube end portion 14. The complaint member has a flat base portion 21 and a plurality of projecting portions 36, each of which extends away from the base portion 21. The compliant member 22 is elastic and therefore resiliently compressible, being made for example from a synthetic rubber material. FIG. 5 shows the arrangement when assembled and FIG. 6 shows an inside end view of the header plate 20, the compliant member 22 and a tube end surface 26 of the tube end 13.

In this example, the tubes 2 are formed of aluminium and have a single longitudinally extending channel 28. Although not illustrated, the skilled person will appreciate that such tubes may, however, be folded and have one or more additional channels. A folded tube having two side-by-side channels is often referred to as a 'B-tube' due to its cross-sectional shape perpendicular to a longitudinal axis 29 of the tube 10. Folded tubes offer increased strength compared to tubes having a single channel, whilst allowing the use of thinner and lighter materials in their construction. Single channel tubes are, however, better suited to having their ends expanded and sealed with a compliant member, as will be explained in more detail below.

The tubes 2 and end strips 8 are typically formed from sheet metal, for example aluminium. In the case of the tubes, two opposing edges of the sheet metal are brought together to form a seam along the length of the tube 2, and this seam is then brazed to seal the tube 2. The fins 4 are also typically formed from sheet metal, for example aluminium, and in this example each fin 4 is folded in a zigzag or triangular pattern.

As can be seen from a comparison of FIGS. 4 and 6, the heat transfer portion 15 of each tube 2 is generally flattened such that it has a first, wider or broader dimension 31 and a second, thinner or narrower dimension 32. In particular, an outer wall 33 of the heat transfer portion 15 of the tube comprises opposing, generally planar, broad portions or sides 34 and opposing, generally curved, narrow portions or sides 35 extending between the broad sides. The tube 2 is flattened so that the seam (not illustrated) runs to extend across the narrower dimension 32 of the tube 2. The heat transfer portion 15 is therefore elongate in cross-sectional shape in a horizontal plane that extends transversely to the length of each tube 2.

In the context of the present invention, the term "flat" or "flattened" is used in relation to an object having a broad thin shape, i.e. an object having a relatively broad surface in relation to a thickness or depth.

Figure 9:
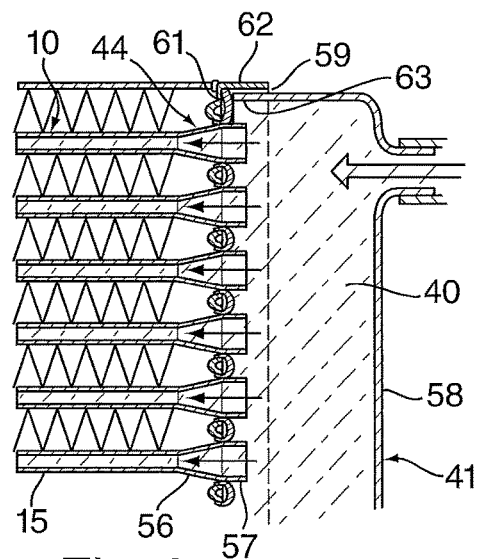
FIGS. 9 and 10 show how, after removal of the expansion tool, a header cover is connected to the header base plate to complete the assembly of the heat exchanger in the first preferred embodiment of the invention, following which coolant can be made to flow through the heat exchanger.

As shown in FIGS. 9 and 10, the plurality of tubes 2 extends between a first header 41 and a second header 42 to convey a heat exchange fluid or coolant 40 between the headers. The tubes 2 are laterally spaced apart along the height of the heat exchanger 100, and the gaps 6 inside of which the fins are bonded are defined between opposing broad portions 34 of the outer walls 33 of adjacent pairs of tubes 2.

Typically, in use, a heated coolant 40 flows through the tubes 2 and a cooler fluid, for example air, flows through gaps or holes in the matrix 10. Heat energy from the coolant is transferred to the walls 33 of the tubes 2 and then into the fins 4 and this heat energy is then radiated from the outer surfaces of the tubes 2 and fins 4, aided by the flow of the cooler fluid or air. The flattened shape of the tubes 2 maximises their surface to volume ratio, increasing the efficiency of the heat exchanger 100, while at the same time providing strength and physical protection for the fins 4, which are substantially flush with the two opposing shorter sides 35 of the heat transfer portion 15 of the tube 2 on opposite front and rear faces of the matrix 10.

During operation of the heat exchanger 100, the matrix 10 is subject to thermal cycling (rise and fall of the temperature of the heat exchanger components) which is typically uneven and therefore leads to uneven stresses due to thermal expansion. Neighbouring tubes may expand to different degrees such that axial loads are imposed on the tubes 2 by their neighbours. This is not a problem within the matrix, which is mechanically robust, but can lead to failure when both headers are brazed to a metallic header or header plate. Such header/tube joints are, therefore, prone to failure because of the stress concentrations that occur along the header/tube joint, with failure most commonly occurring at the intersection of the curved, narrow portions 35 of the tube and the header base plate.

The current invention deals with this problem by providing, along at least one of the headers, and most preferably both headers, one or more mechanical joints between the tubes and headers which permit some degree of longitudinal movement for those tubes that are mechanically joined, while maintaining a good seal against egress of coolant.

In the first embodiment of FIGS. 4 to 10, the compliant member 22 has one or more rims or lips 36 each one of which extends through the base plate 20 in contact with an edge 37 of one of a plurality of apertures 38 in the base plate 20. Each of the rims or lips 36 therefore provides a sealing portion of the compliant member 22 between each tube end portion 14, 14' and base plate 20.

Although the drawings show the compliant member 22 as assembled with the base plate 20 before the tube end portions 14, 14' have been inserted into the respective base plate apertures 38, and before the top and bottom end strips 8 have been welded at a seam 23 to an external surface of the base plate, it should be noted that the elasticity of the compliant member 22 permits the projecting rims 36 of the compliant member 22 to be inserted between the tube end portions 14, 14' and the base plate apertures 38 after the assembly of the matrix 10 to the header base plate 20 and after fusing of the end strips 8 to the base plate 20.

The compliant member 22 is then held between opposing surfaces of each tube end portion 14, 14' and the corresponding aperture 38 in the base plate 20. Inside each rim 36 of the compliant member 22 is an aperture 39 that matches the profile of the tube end portion 14, such that each tube end portion 14 can slip inside a corresponding one of the apertures 39 in the compliant member 22, as shown in FIG. 5.

Figure 7:
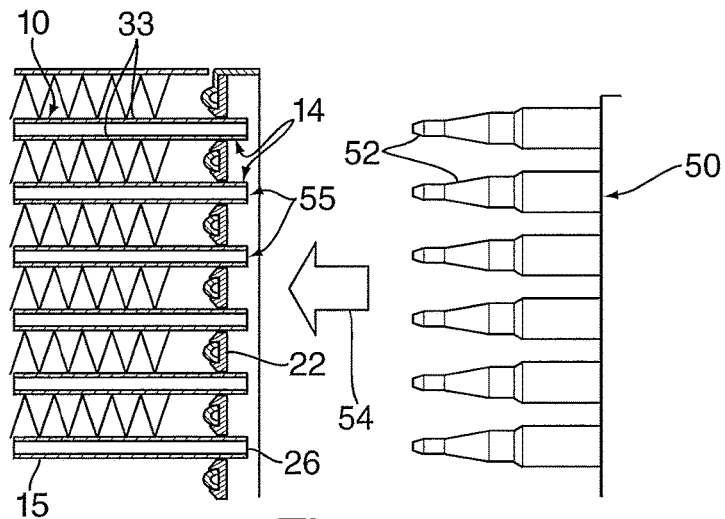
FIG. 7 shows the connected header base plate and matrix of FIG. 5, and how an expansion tool is moved in a longitudinal direction towards the tube ends.
Figure 8:
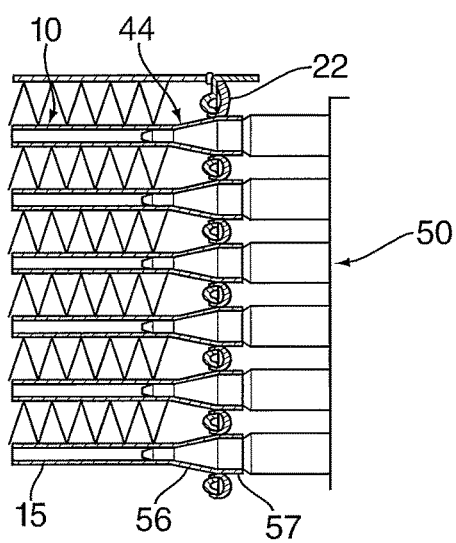
FIG. 8 shows how the expansion tool has a number of bullet nosed projections that are pressed into the openings of each of the tube end portions in order to deform each of the tube walls outwardly around the full perimeter of each opening, and how the compliant members are thereby compressed in the process to make a seal with the tube end portions.

As shown in FIGS. 7 and 8, an expansion tool 50 with a plurality of tapered noses 52 is then moved in a longitudinal direction 54 towards the corresponding tube end portions 14 and then pressed into openings 55 at each end tube end 13. This causes the tube outer wall 33 to expand to match the shape of the tool nose 52. The broad portions 34 of the tube wall are expanded outwards. In this example, the opposing narrow portions 35 are also expanded outwards as the broad portions 34 move apart. This creates an expanded tube end portion 44 having a tapered section 56 in which the cross-section is progressively expanded and an endmost straight section 57 in which the cross-section is constant. In this way, the sealing portion 36 of the compliant member 22 is compressed or pinched between the expanded tube end portion 44 and the base plate aperture edge 37.

The constant cross-section is in contact with the compliant member 22, which is compressed in this process to make tight contact with the expanded tube end portion 44. The length of the endmost straight section 57 is sufficient such that this straight section remains in contact with the aperture 39 of the compliant member rim 36 during relative longitudinal movement of the expanded tube end portion 44 and header or header base plate 20 owing to thermal cycling of the assembled heat exchanger 100.

When the tubes 2 expand or contract longitudinally, the compliant member 22 permits some movement, preferably by flexing alone, although in some embodiments, a degree of slippage may be possible as long as the shape of the compliant member is such that this cannot over time work itself free. In this regard, although not illustrated, each aperture edge 37 may be seated in a groove in an outer surface of the lip or rim of the compliant member 22 which will then have groove walls that contact both the outer and inner sides of the base plate 20 around the aperture edge 37.

The assembly of each header 41, 42 is completed by fitting a header cover 58 to the header base plate 20. The header cover 58 may be metal or polymer, and may be joined to the base plate 20 along a seam 59 by conventional means, for example by gluing, crimping, or brazing. In this example, the compliant member 22 has a peripheral edge 61 that extends around the inside of a longitudinally projecting rim 62 of the header plate. The compliant member edge 61 is compressed during this joining of the cover 58 by a peripheral lip 63 of the cover in order to make the seal. This also provides the benefit of securing the compliant member 22 in place so that this does not slip in a lateral direction.

In the case where some, but not all, of the tube ends 13 are to be fused to the header or the header base plate 20 in the heating and fusing process 11 or afterwards, those tube ends which are to be fused are placed substantially in contact with the edges of an aperture (i.e. in contact with or separated by preferably no more than about 0.1 mm). The aperture edge then has smaller dimensions wherein the tube wall 33 at the tube end surface 26 overlaps the aperture edge. Each of the apertures is therefore correspondingly reduced in size from those illustrated, to match the dimensions of the opening 55 at the tube end. In the case of an aperture where no such fusing of metal is to occur, the base plate apertures 37 are sized as shown in the drawings so that the tube ends 13 at these apertures remain free. Such tube ends may, optionally, be longer than those to be fused, so that the free tube ends 13 protrude through each base plate aperture by the amount shown in FIG. 7, whilst the fused tube ends can be terminated at a shorter length, similar to that of the protective strip 8, where these are joined to the metal of the header base plate. Each free tube end is then positioned with a clear gap between the tube end and the corresponding aperture. The compliant member 22 is then inserted over the tube ends 13 and into this gap, after which the tube ends are expanded by a tool as described above to crimp the compliant member.

Although the above description relates to an assembly with a single component providing the compliant member for sealing each tube end portion, there may be multiple, physically separate compliant members, each one of which extends around the periphery of each base plate aperture. This embodiment, in which some, but not all, of the tube ends 13 are to be fused to the header or the header base plate, is suited to separate compliant members, one for each expanded tube end portion 44 to be sealed.

Therefore, the invention extends to the case where there is a combination of metal fused joints and mechanical joints along one or both of the headers. Such an arrangement may be desirable because metal-to-metal fused joints will, in general, be less expensive to achieve in a manufacturing process than mechanical joints. In practice, it has been found that not all metal-to-metal joints between tube ends and the respective headers or header base plates are equally likely to fail owing to thermal stresses.

As an example of this, in FIG. 10, one of the headers 41 has an internal dividing wall 65 which separates the header into an inlet side and an outlet side. Relatively hotter coolant 40 will therefore flow out of an inlet port 43, into the inlet side of the header and into a first set of tubes and relatively cooler coolant will flow in a directly adjacent second set of tubes towards the outlet side of the header and an outlet port 45. In this arrangement, the two joints most likely to fail are those connected to the first header 41 closest on either side of the internal dividing wall 65, because this is where there is the greatest difference in temperature between adjacent tubes. Therefore, for this example the maximum benefit from the invention, for the least manufacturing cost, will be to provide mechanical joints just to those two tubes connected on either side of the dividing wall 65 that would otherwise be subjected to the greatest stress, leaving other tubes with a metal-to-metal fused joint.

The particular choice of which tubes should have mechanical joints will, therefore, depend on the particular design and use of the heat exchanger 100.

When there are no ends strips 8 joined to the headers or base plates, then there is a particular advantage in providing at least the two outermost tubes at opposite top and bottom ends of the array of tubes with a metal-to-metal fused joint to the headers or base plates, as this will provide a solid connection and will therefore prevent any intervening mechanical joints from ever working apart.

FIGS. 10 to 17 show a second embodiment of the invention, in which features similar to or the same as those of the first embodiment described above, are indicated using reference numerals incremented by 100.

The second embodiment differs from the first in two main respects. First, the compliant member 122 is assembled to the base plate 120 from the opposite side, i.e. from the outside of the base plate 120 facing the matrix 110. As in the first embodiment, the compliant member 122 provides apertures 139 that match the profile of the tube end portion 114, such that each tube end portion 114 can slip inside a corresponding one of the apertures 139 in the compliant member 122. The compliant member 122 therefore needs to be assembled to the base plate 120 before the tube end portions 114 are inserted into corresponding apertures 138 in the base plate 120, and before the protective strip 108 is fused to the outside of the header base plate 120.

The second main difference is that each aperture 138 provided in the base plate 120 is bounded by a wall 70 that provides the edge 137 to each aperture 138 and which extends parallel with the tube axis 129 to form U-shaped portions in between each aperture 138. The compliant member 122 has a base portion 121 in contact with the external surface of the header plate and a plurality of projecting portions 136 that extend away from the base portion 121 parallel with the tube axis 129 with a greater length relative to those projecting portions 36 of the first embodiment. The projecting portions 136 provide the sealing portions of the compliant member 122.

The effect of these changes is to increase the surface contact area of the compliant member sealing portion 136 against the respective tube end portion 114 and the aperture edge 137. This is useful as in this configuration seating of the compliant member 122 will need to resist outward forces from the coolant, which will generally be circulating in a pressurized circulation loop.

Figure 16:
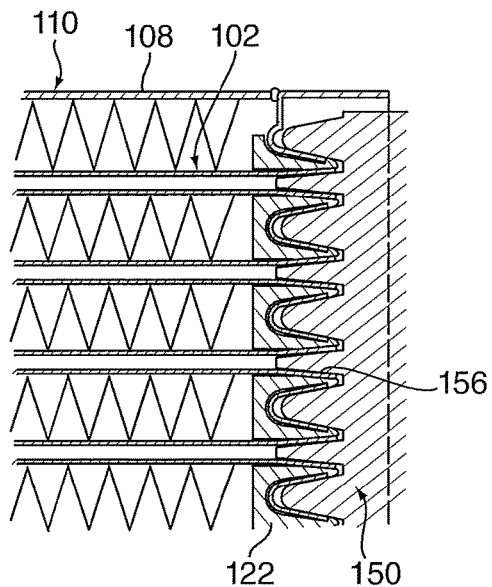
FIGS. 16 and 17 follow on from FIG. 14 and show in cross-section how the tool is used to deform outwardly the openings of each of the tube end portions, while at the same time deforming outwardly the cup-shaped portions of the metallic header base plate on either side of each tube end portion.
Figure 17:
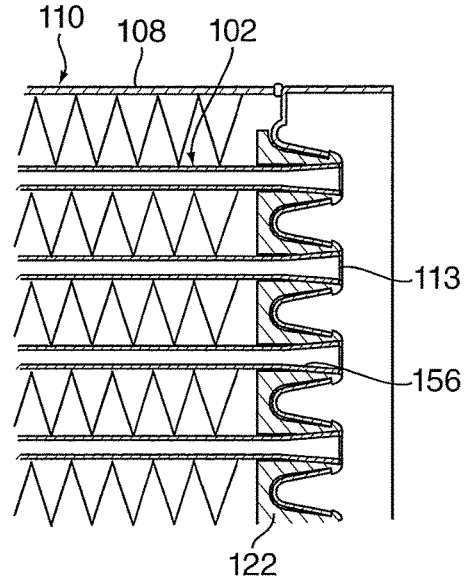
Figure 18:
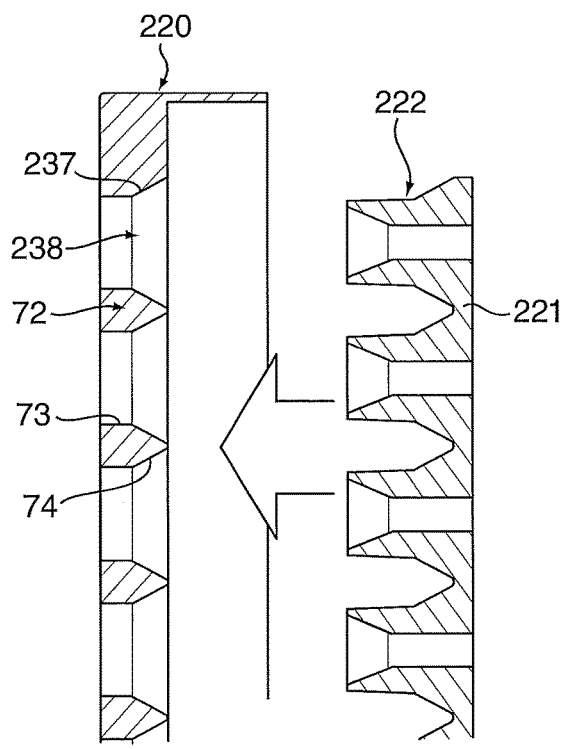
FIG. 18 is a cross-sectional view of a part of a plastic material header base plate and a compliant member which is to be fitted to an internal surface of the header base plate, for use in a heat exchanger according to a third preferred embodiment of the invention.
Figure 19:
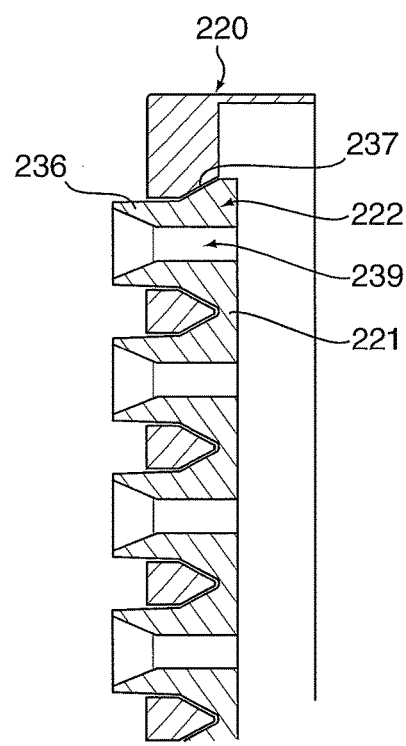
FIG. 19 shows the header base plate and a compliant member of FIG. 12 when fitted together.
Figures 20, 21:
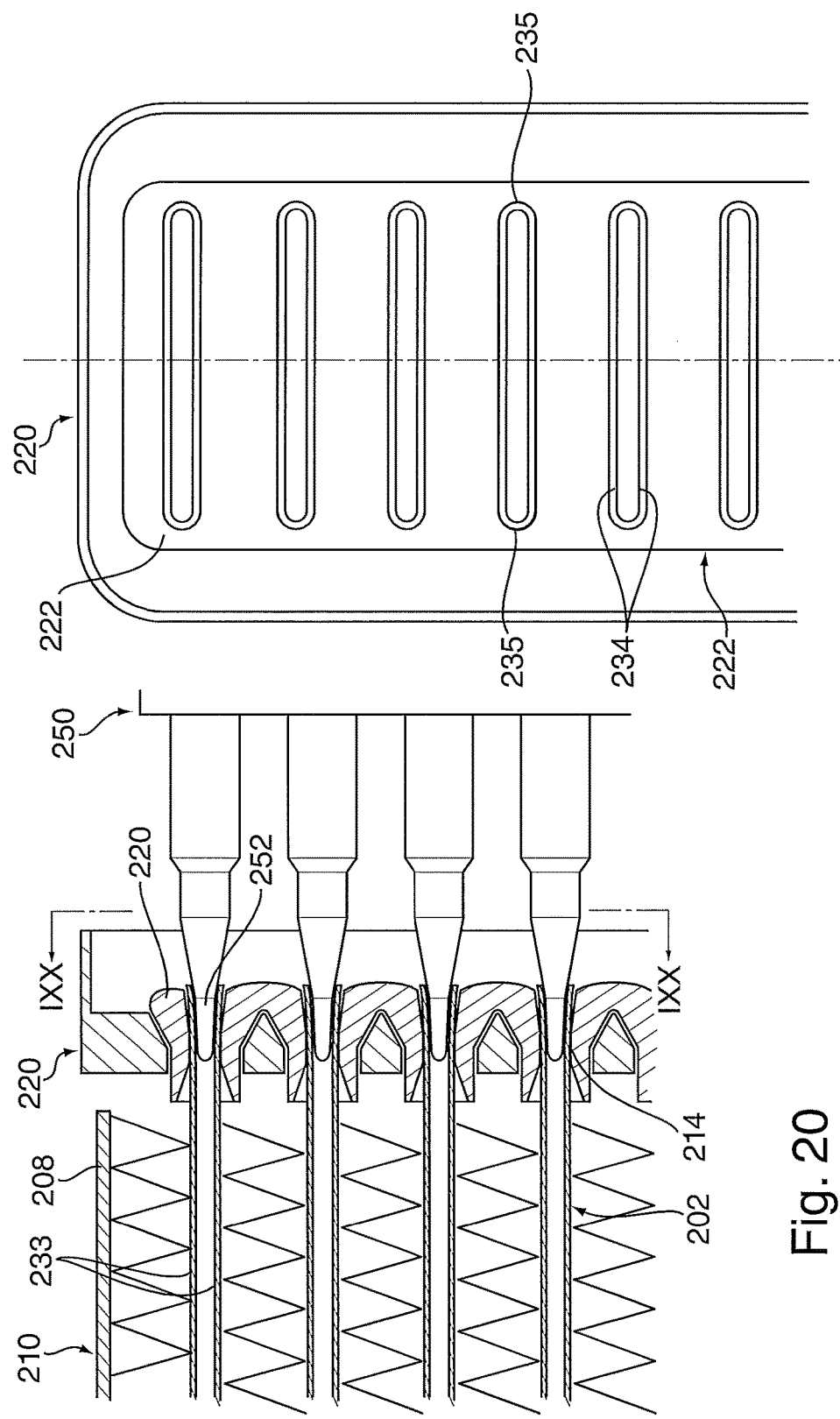
FIG. 20 is a cross-sectional view of a part of the plastic material header base plate and compliant member of FIG. 19, after tube end portions of the brazed matrix have been inserted through apertures in the compliant member, with an expansion tool being used to expand the tube end portions and compress the compliant member to make to make a seal with the tube end portions.
FIG. 21 is a plan view inside of the plastic material header base plate showing internal parts of the compliant member fitted to the header base plate, taken along line XXI-XXI of FIG. 20 after withdrawal of the expansion tool.

In this embodiment, the base plate 120 is of metal so that the aperture edges 137 can be deformed by the tool 150. As shown in FIGS. 14, 16 and 18, the invention further improves the seating of the compliant member 122 by crimping both the tube end portions 114 and the walls 70 in order to compress the sealing portions of the compliant member 122 from opposite sides.

An expansion tool 150 with two different types of tapered noses, one type 152 for the tube end openings 155 and the other type 152' for the base plate aperture walls 70, is then moved in a longitudinal direction 154 towards the corresponding tube end portions 114 and then pressed into openings 155 at each end tube end 113. This causes the tube outer wall 133 to expand to match the shape of the corresponding tool nose type 152. At the same time, the other tool nose type 152' causes the aperture walls 70 to deflect towards the adjacent tube end portions 114. Although not shown in the drawing, this happens around the full periphery of each base plate aperture 138. In this way, the synthetic rubber sealing portion 136 of the compliant member 122 is compressed or pinched between the expanded tube end portion 114 and the base plate aperture edge 137.

The broad portions 134 of the tube wall are expanded outwards. In this example, the opposing narrow portions 135 are also expanded outwards as the broad portions move apart. This creates an expanded tube end portion 114 having a tapered section 156 extending all the way to the tube end 113 in which the cross-section is expanded. When the tubes 102 expand or contract longitudinally, the compliant member 122 permits some movement by flexing alone.

Although not illustrated, the assembly of each header is completed by fitting a header cover to the header base plate in the same way as in the first embodiment.

The invention is also applicable to headers and header base plates made from a polymer material, however, in this case there will, of course, be no metal-to-metal fused joints. A mechanical joint with a polymer header may be made in the same manner as described above, however, polymer materials provide other ways in which to compressibly seat the tube end portion in a compliant edge seal.

FIGS. 18 to 22 shows a third embodiment of the invention and FIG. 23 shows a variant of this embodiment, in which features similar to or the same as those of the first embodiment described above, are indicated using reference numerals incremented by 200.

The third embodiment differs from the first embodiment mainly in that the header has a polymer material base plate 220 and a polymer material cover 258. As in the first embodiment, the synthetic rubber compliant member 222 is seated inside the header plate, and has a base portion 221 in contact with the internal surface of the header plate and a plurality of projecting portions 236 that extend away from the base portion parallel with the tube axis 229.

As the base plate 220 is formed in a known injection moulding process, the base plate 220 can easily be provided with varying wall thicknesses, and so the base plate 220 has a portion 72 with a trapezoidal cross-section or arrow head cross-section in between each base plate aperture 238, and which extends around the ends of each aperture and around the two outermost apertures as two angled wall surfaces, one of which 73 is parallel with the tube axis 229 and the other of which 74 is angled away from the aperture 238 and the tube axis 229. The compliant member 222 has the inverse shape so as to make full contact with these two angled wall surfaces 73, 74. The projecting portions 236 of the compliant member 222 therefore have a greater length relative to the projecting portions 36 of the first embodiment in order to engage fully with the two angled wall surfaces 73, 74.

As in the first embodiment, the compliant member 222 provides apertures 239 that match the profile of the tube end portion 214, such that each tube end portion 214 can slip inside a corresponding one of the apertures 239 in the compliant member 222. After insertion of the tube end portions 214 into the apertures 239, an expansion tool 250 having a plurality of tapered noses 252 is inserted into tube openings 255 to expand the tube end portions. This causes the tube outer wall 233 to expand to match the shape of tool noses 252 around the full periphery of each base plate aperture 238. In this way, the sealing portion 236 of the compliant member 222 is compressed or pinched between the expanded tube end portion 244 and the two angled wall surfaces 73, 74 that define the base plate aperture edge 237.

The broad portions 234 of the tube wall are expanded outwards. In this example, the opposing narrow portions 235 are also expanded outwards as the broad portions 234 move apart. This creates an expanded tube end portion 244 having a tapered section 256 extending all the way to the tube end 213 in which the cross-section is expanded. When the tubes 202 expand or contract longitudinally, the compliant member 222 permits some movement by flexing alone.

The assembly of each header 241 is completed by fitting a header cover 258 to the header base plate 220. FIGS. 22 and 23 show two ways in which this can be done.

In FIG. 22, the cover 258 has a peripheral lip 263 with a groove 76 into which a longitudinally projecting rim 262 of the base plate fits. The polymer material cover may then be joined to the polymer material base plate by vibration welding or by gluing.

In FIG. 23, the compliant member 222' has the same form as that of FIG. 22, but is extended laterally to reach the base plate rim 262'. The base plate rim 262' has around its outer periphery a series of laterally outwardly projecting detents one of which 77 is shown in cross-section. Each detent 77 snaps into engagement with a ledge 78 at the end of an open slot 79 in the cover 258'. In this process, a peripheral lip 263' of the cover 258' inserts inside the base plate rim 262'. The compliant member 222' has a peripheral edge 261 that extends around the inside of the longitudinally projecting rim 262' of the header base plate. The compliant member edge 261 is compressed during this joining of the cover 258' by the peripheral lip 263' of the cover in order to make the seal. This also provides the benefit of securing the compliant member in place so that this does not slip in a lateral direction.

When the header is a polymer header, as in FIGS. 22 and 23, there will be no join between the all-metal matrix and the polymer header formed using a heating and fusing process. Therefore, as shown in FIGS. 22 and 23, when there is a strip 208 extending across the matrix between the heads, this will not be joined to the headers.

The compliant members in the various embodiments described above are most preferably made from ethylene propylene diene rubber (EPDM). Alternatively, a silicone rubber material may be used.

The skilled person will appreciate that heat exchangers can, in general, be operated in any orientation. Therefore, references in this specification to top and bottom, left and right, up and down, horizontal and vertical are to be read accordingly, but are not to be taken as being exact orientations and thereby limiting the scope of the invention.

The present invention, therefore, provides a heat exchanger that has improved durability against thermal cycling while maintaining good heat transfer efficiency.

While certain representative embodiments and details have been shown for purposes of illustrating the invention, it will be apparent to those skilled in the art that various changes may be made without departing from the scope of the disclosure, which is further described in the following appended claims.

The invention claimed is:
1. A heat exchanger comprising:
an all-metal bonded matrix including a plurality of substantially parallel metallic tubes and a plurality of metallic fins, the tubes having a heat transfer portion, the heat transfer portion having an elongate cross-sectional shape and comprising two opposing longer sides, and two opposing shorter sides, and the fins disposed between the opposing longer sides of the heat transfer portion of adjacent tubes; and
a first header and a second header, each of the tubes having at opposite ends thereof a first end portion and a second end portion, the first end portion and the second end portion joined respectively to the first header and the second header, the matrix thereby configured to transfer heat between an external medium and a coolant conveyed between the first header and the second header by the tubes;
wherein at least one of the tubes is mechanically joined at the first end portion to the first header by at least one compliant member, the compliant member extending around the first end portion to provide a seal with the first end portion for the coolant held within the heat exchanger and permitting relative movement between the at least one of the tubes mechanically joined and the first header due to thermal expansion and contraction of the matrix;
wherein the matrix further comprises at least one strip arranged substantially parallel with the tubes, the at least one strip disposed at one end of the matrix and in contact with an external surface of the first header and an external surface of the second header to provide a mechanical rigidity of a connection formed between the matrix and each of the first header and the second header, wherein the first header has an internal dividing wall which separates the first header into an inlet side and an outlet side, wherein the tubes include a first tube closest to the dividing wall at the inlet side, a second tube closest to the dividing wall at the outlet side, and other tubes, wherein the first tube and the second tube are mechanically joined to the first header, and wherein the other tubes are metal bonded to the first header.

2. The heat exchanger as claimed in claim 1, wherein at least one of the tubes is joined at both the first end portion and the second end portion thereof to corresponding ones of the first header and the second header by an all-metal bond formed between the first end portion and the second end portion and the first header and the second header.

3. The heat exchanger as claimed in claim 2, wherein there is a plurality of all-metal bonded tubes, and the at least one of the tubes mechanically joined is disposed in between the all-metal bonded tubes.

4. The heat exchanger as claimed in claim 1, wherein:
the first header has a first base plate with a plurality of apertures;
each of the end portions is received within a corresponding one of the apertures of the first base plate; and
a sealing portion of the compliant member is interposed between an edge forming the aperture in the first base plate and the first end portion of the at least one of the tubes mechanically joined, the first end portion thereby mechanically joined to the first header.

5. The heat exchanger as claimed in claim 4, wherein the first end portion of the at least one of the tubes mechanically joined has an expanded portion, the sealing portion of the compliant member compressed around the aperture by the expanded portion of the at least one of the tubes mechanically joined.

6. The heat exchanger as claimed in claim 5, wherein the expanded end portion has an enlarged cross-sectional shape relative to the heat transfer portion, the enlarged cross-sectional shape compressing the sealing portion of the compliant member between the first end portion and the aperture of the first base plate.

7. The heat exchanger as claimed in claim 5, wherein the expanded end portion has an elongate cross-sectional shape, and comprises two opposing, longer sides, and two opposing shorter sides.

8. The heat exchanger as claimed in claim 7, wherein an outwardly tapered section of the tube extends from the heat transfer portion towards the expanded end portion wherein the distance between the two opposing longer sides is increased and the distance between the two opposing shorter sides is increased.

9. The heat exchanger as claimed in claim 7, wherein the first end portion of the at least one of the tubes mechanically joined has an opening for conveying the coolant, the two opposing longer sides of the expanded end portion splayed outwards proximate the opening and the two opposing shorter sides of the expanded end portion splayed outwards proximate the opening.

10. The heat exchanger as claimed in claim 5, wherein the expanded end portion has a section with a substantially constant cross-sectional shape in contact with the sealing portion of the compliant member, whereby the sealing portion is neither compressed nor expanded, owing to relative movement of the first end portion of the at least one of the tubes mechanically joined and the first header due to thermal expansion and contraction of the matrix.

11. The heat exchanger as claimed in claim 4, wherein the compliant member has a base portion and at least one projecting portion, the base portion seated on a surface of the first base plate and the at least one projecting portion extending through a corresponding one of the apertures in the first base plate, whereby the sealing portion of the compliant member is interposed between the first base plate and the first end portion of the at least one of the tubes mechanically joined.

12. The heat exchanger as claimed in claim 11, wherein the base portion of the compliant member is a sheet with a plurality of apertures formed therein, each of the apertures in the sheet having a raised rim that forms the projecting portion, the raised rim of the apertures extending through a corresponding one of the apertures in the first base plate, whereby the raised rim of each of the apertures is interposed between the first base plate and the first end portion of the at least one of the tubes mechanically joined to provide the sealing portion.

13. The heat exchanger as claimed in claim 12, wherein the base portion of the compliant member is seated on an external surface of the first base plate facing substantially towards the matrix.

14. The heat exchanger as claimed in claim 12, wherein the base portion of the compliant member is seated on an internal surface of the first base plate facing substantially away from the matrix.

15. A heat exchanger as claimed in claim 14, wherein the first base plate has a periphery and the first header has a header cover joined to the periphery of the first base plate, the first header cover and the sheet extending to the periphery of the first base plate and providing a seal around the periphery of the first base plate between the first base plate and the first header cover.

16. A method of manufacturing a heat exchanger, the heat exchanger comprising an all-metal bonded matrix, the method comprising the steps of:
forming a first header, the first header having a first set of apertures;
forming a second header, the second header having a second set of apertures;
forming a plurality of elongate metallic tubes, each of the tubes having a first end portion and a second end portion and an opening at both of the first end portion and the second end portion for conveying a coolant through the tubes from the first header to the second header, and each of the tubes having between the first end portion and the second end portion a heat transfer portion for transferring heat with an external medium, the heat transfer portion having an elongate cross-sectional shape, and comprising two opposing longer sides, and two opposing shorter sides;
forming a plurality of metallic fins;
orienting the tubes and the fins wherein the tubes are substantially parallel with one another and with the fins extending between the opposed longer sides of adjacent pairs of the tubes;
holding temporarily the oriented tubes and fins with at least one strap;
using a heating and fusing process to join together the tubes and the fins to form the all-metal bonded matrix, the matrix having a first face and a second face wherein an external medium may flow through the matrix from the first face to the second face to effect a transfer of heat between the coolant conveyed by the tubes and the external medium;

removing the at least one strap after the heating and fusing process;

aligning the first end portions with the first set of apertures and aligning the second end portions with the second set of apertures and joining each of the first end portions and the second end portions to the corresponding aligned set of apertures; and receiving the first end portion of at least one of the tubes within a corresponding aperture of the first set of apertures and using a compliant member to join the at least one of the tubes to the first header in a mechanical joint between the first end portion of the first header and the corresponding aperture within which the first end portion is received, the compliant member providing a seal around the first end portion for the coolant and permitting relative movement along the length of the at least one of the tubes mechanically joined between the joined first end portion and the first header due to thermal expansion and contraction of the matrix, wherein the first header has an internal dividing wall which separates the first header into an inlet side and an outlet side, wherein the tubes include a first tube closest to the dividing wall at the inlet side, a second tube closest to the dividing wall at the outlet side, and other tubes, wherein the first tube and the second tube are mechanically joined to the first header, and wherein the other tubes are metal bonded to the first header.

17. The method as claimed in claim 16, further comprising the steps of:
forming a first base plate, the first set of apertures provided in the first base plate;
forming a second base plate, the second set of apertures provided in the second base plate;
forming a first header cover and assembling the first header cover to the first base plate to form the first header; and
forming a second header cover and assembling the second header cover to the second base plate to form the second header.

18. The method as claimed in claim 17, wherein the first base plate has a periphery, the compliant member extending to the periphery inside the first header, the method further comprising the step of joining the first header cover to the first base plate at the periphery with the compliant member providing a seal between the first header cover and the first base plate at the periphery.

19. The method as claimed in claim 17, wherein the second base plate is metallic and the method further comprises the step of joining each of the tubes at the second end portions thereof to the second header by an all-metal bond in a heating and fusing process between the second end portions and the second header.

\* \* \* \* \*